US012729118B2

(12) United States Patent
Hwangbo et al.

(10) Patent No.: US 12,729,118 B2

(45) Date of Patent: Sep. 8, 2026

(54) NITRIC OXIDE WATER GENERATION SYSTEM HAVING PURIFYING PART FOR AUTOMATICALLY PURIFYING WATER IN REACTION CHAMBER

(71) Applicants: Kiman Hwangbo, Namyangju-si (KR); Daehwa Hwangbo, Namyangju-si (KR)

(72) Inventors: Kiman Hwangbo, Namyangju-si (KR); Daehwa Hwangbo, Namyangju-si (KR)

( * ) Notice: Subject to any disclaimer, the term of this patent is extended or adjusted under 35 U.S.C. 154(b) by 974 days.

(21) Appl. No.: 17/670,170

(22) Filed: Feb. 11, 2022

(65) Prior Publication Data

US 2023/0257267 A1 Aug. 17, 2023

(51) Int. Cl.

*C01B 21/24* (2006.01)
*B01J 19/00* (2006.01)
*B01J 19/08* (2006.01)

(52) U.S. Cl.

CPC ............. *C01B 21/24* (2013.01); *B01J 19/088* (2013.01); *B01J 19/0013* (2013.01); *C01P 2006/82* (2013.01)

(58) Field of Classification Search

CPC ... C01B 121/24; B01J 19/0013; B01J 19/088; C01P 2006/82

See application file for complete search history.

(56) References Cited

U.S. PATENT DOCUMENTS 3,262,869 A * 7/1966 Belasco .................... C01B 5/00 205/628
2020/0360649 A1* 11/2020 Hall ...................... A61M 16/10

FOREIGN PATENT DOCUMENTS

KR 10-1379274 B1 3/2014
KR 10-1572384 B1 11/2015

OTHER PUBLICATIONS

S.R. Li, Y.F. Huang , Z. Liu, M.H. Sui, J.M. Liu , K.P. Yan, Production of medically useful nitric monoxide using AC arc discharge. Nitric Oxide. 2018, 73, 28, 89-95 (Year: 2018).*

English Translation of KR101572384B from google patents (Year: 2024).*

Astarita, A., Curioni, M., Squillace, A., Zhou, X., Bellucci, F., Thompson, G.E. and Beamish, K.A. (2015), Corrosion behaviour of stainless steel-titanium alloy linear friction welded joints: Galvanic coupling. Materials and Corrosion, 66: 111-117. (Year: 2014).*

* cited by examiner

*Primary Examiner* — Brian W Cohen
*Assistant Examiner* — Nathanael Jason Downes
(74) *Attorney, Agent, or Firm* — Heedong Chae; Lucem, PC

(57) ABSTRACT

The present invention relates to a nitric oxide water generating system including: a nitric oxide generating part for generating nitric oxide steam from water and air supplied to a reaction chamber through arc discharge; a refining part connected to the nitric oxide generating part to refine the nitric oxide steam generated from the nitric oxide generating part into high purity nitric oxide steam through an adsorbent filtration material; a condensing part connected to the refining part to condense the nitric oxide steam refined by the refining part into nitric oxide water in liquid phase through a water-cooling chiller and an air-cooling chiller; and a purifying part connected to the nitric oxide generating part and, if the water in the reaction chamber becomes turbid, for automatically purifying the turbid water in accordance with a signal sensed from a sensor for sensing a pre-set electric current value of a discharge power source.

7 Claims, 4 Drawing Sheets

NITRIC OXIDE WATER GENERATION SYSTEM HAVING PURIFYING PART FOR AUTOMATICALLY PURIFYING WATER IN REACTION CHAMBER

BACKGROUND OF THE INVENTION

Field of the Invention

The present invention relates to a nitric oxide water generation system having a purifying part for automatically purifying water in a reaction chamber, and more specifically, a nitric oxide water generating system including: a nitric oxide generating part for generating nitric oxide steam from water and air supplied to a reaction chamber through ultra-high heat generated from arc discharge and high heat generated from discharge light; a refining part connected to the nitric oxide generating part to refine the nitric oxide steam generated from the nitric oxide generating part into high-purity nitric oxide steam through an adsorbent filtration material; a condensing part connected to the refining part to condense the nitric oxide steam refined by the refining part into nitric oxide water in liquid phase; and a purifying part connected to the nitric oxide generating part to automatically purify the water in the reaction chamber in accordance with a signal sensed from a sensor for sensing a degree of turbidity of the water in the reaction chamber through an electric current value of a discharge power source.

According to the present invention, the nitric oxide water generation system is configured to allow the nitric oxide water to be generated through the purification and condensation of the nitric oxide steam generated from the nitric oxide generating part, and further, if the water in the reaction chamber, whose internal state is hard to be observed from the outside, becomes so turbid that it has to be purified, to allow the water in the reaction chamber to be automatically purified in accordance with the sensed signal for the pre-set electric current value through the sensor, without stopping generating the nitric oxide steam, thereby generating high-purity nitric oxide water more efficiently and economically.

Background of the Related Art

Generally, nitric oxide NO is a colorless and odorless gas phase material and made in a laboratory by injecting nitric acid having a density of 1.2 into copper Cu. In this case, a chemical formula is $3C+8H(NO_2)=3Cu(NO_3)+4H_2O+2NO$. If nitric oxide comes into contact with air or oxygen $O_2$, it changes into reddish brown nitrous acid $HNO_2$ and is then dissolved into nitric oxide or nitrate salts. About 0.07v % of nitric oxide is dissolved in 1v % of water, and nitric oxide has strong activity so that it acts with other materials.

Further, nitric oxide produced biologically from the arterial endothelial cells of the human body is cell signaling molecules serving to increase a blood flow through the expansion of a blood vessel, so that nitric oxide is known as a strong blood vessel expanding material capable of controlling a blood pressure and suppressing blood clots from being produced.

Persons who for the first time find the effect of nitric oxide on the human body are Louis ignarro et al., and as a result, Novel prize in physiology or medicine in 1998 is awarded to them. After that, an interest in the medical field in nitric oxide has been increased. Recently, it is checked that when nitric oxide respiration, not aerobic respiration is applied to a coronavirus disease-19 (COVID-19) patient, good results are obtained, and further, other reports on the studies of nitric oxide have been continuously proposed. Moreover, nitric oxide has excellent antibacterial performance and deodorization, and studies on the industrial utilizations of nitric oxide have been dynamically made in various fields such as quarantine, medicine, medical devices, cosmetic drinks, agriculture, products, livestock farming, fisheries industry, microorganisms, and the like.

Conventional methods for producing nitric oxide include a method for producing nitric oxide by contacting air or oxygen O and nitrogen N on a plasma region of arc discharge, a method for producing nitric oxide through arch discharge from water and air supplied to a reaction chamber having a given volume, a method for producing nitric oxide by contacting oxygen and nitrogen gases refined in a reaction chamber with each other through arc discharge, and other methods for producing nitric oxide.

The method for producing nitric oxide through arch discharge from water and air supplied to the reaction chamber is disclosed in Korean Patent No. 10-1572384 (issued on Nov. 26, 2015), No. 10-1540543 (issued on Jul. 29, 2015), and No. 10-1689275 (issued on Jan. 3, 2017), and the method for producing nitric oxide by contacting oxygen and nitrogen gases refined in a reaction chamber with each other through arc discharge is disclosed in Korean Patent No. 10-2229765 (issued on Mar. 18, 2021).

In the case of the conventional method for producing nitric oxide steam through arch discharge from the water and air supplied to the reaction chamber, generally, as purified water is used, the conventional method has little interest in a degree of turbidity of water in the reaction chamber that is hard to be observed from the outside. Since the water supplied to the reaction chamber is underground or tap water, however, even though the water in the reaction chamber is changed into nitric oxide steam, all kinds of impurities and fine particles remain in the water in the reaction chamber, without being evaporated, so that they are distributedly accumulated. As time passes, accordingly, a density of the impurities becomes increased to cause the water in the reaction chamber to become turbid.

If the water in the reaction chamber becomes turbid, the purity of the nitric oxide steam produced becomes badly influenced, and since the electrical resistance of the discharge power source for the turbid water becomes high, further, it may be higher than an electricity price for the arc discharge used for producing nitric oxide steam, which is not economical.

So as to purify the water in the reaction chamber, further, the production of nitric oxide steam has to be stopped, and after the turbid water in the reaction chamber is all drained, next, clean water has to be supplied from the outside, so that a lot of time is consumed in stopping producing nitric oxide steam and then re-operating the system and a manpower cost for the purification is additionally required.

Therefore, there is a need to develop a new nitric oxide water generation system capable of producing nitric oxide steam through a nitric oxide generating part and, if water in the reaction chamber reaches a degree of turbidity at which purification is needed, continuously operating the nitric oxide generating part, without stopping producing the nitric oxide steam, to automatically purify the water in the reaction chamber.

SUMMARY OF THE INVENTION

Accordingly, the present invention has been made in view of the above-mentioned problems occurring in the related art, and it is an object of the present invention to provide a nitric oxide water generation system having a purifying part for automatically purifying water in a reaction chamber that is capable of continuously generating ultra-high purity nitric oxide steam through arc discharge in water and air supplied to the reaction chamber.

It is another object of the present invention to provide a nitric oxide water generation system having a purifying part for automatically purifying water in a reaction chamber that is capable of automatically purifying the water in the reaction chamber in accordance with the sensed signal through a sensor for sensing a degree of turbidity of the water in the reaction chamber by means of a pre-set electric current value of a discharge power source.

It is yet another object of the present invention to provide a nitric oxide water generation system having a purifying part for automatically purifying water in a reaction chamber that is capable of continuously generating nitric oxide steam, even during the purification of the water in the reaction chamber, thereby more efficiently generating the nitric oxide steam and nitric oxide water.

It is still another object of the present invention to provide a nitric oxide water generation system having a purifying part for automatically purifying water in a reaction chamber that is capable of generating ultra-high purity nitric oxide steam and nitric oxide water economically and at a low cost through the purified water in the reaction chamber.

To accomplish the above-mentioned objects, according to the present invention, there is provided a nitric oxide water generation system including: a nitric oxide generating part for generating nitric oxide steam from water and air supplied to a reaction chamber through ultra-high heat generated from arc discharge and high generated from discharge light; a refining part connected to the nitric oxide generating part to refine the nitric oxide steam generated from the nitric oxide generating part into high purity nitric oxide steam; a condensing part connected to the refining part to condense the nitric oxide steam refined by the refining part into nitric oxide water in liquid phase; and a purifying part connected to the nitric oxide generating part to automatically purify the water in the reaction chamber in accordance with a signal sensed from a sensor for sensing a degree of turbidity of the water of the reaction camber through a pre-set electric current value of a discharge power source.

Now, each part of the nitric oxide water generation system will be explained in detail below.

The nitric oxide generating part may include the reaction chamber for generating the nitric oxide steam, a water supplier for supplying the water to the reaction chamber to a given level, an air pump for supplying the air to the reaction chamber, and a plurality of electrode rods for two-phase or three-phase arc discharge disposed spaced apart from each other by a given distance in parallel with each other in the reaction chamber.

The refining part may include a refining chamber connected to the reaction chamber of the nitric oxide generating part and a multi-stage adsorbent filtration material disposed in the refining chamber to remove various impurities and fine particles contained in the nitric oxide steam introduced from the reaction chamber.

The condensing part may be connected to the refining part and may include a water-cooling chiller and an air-cooling chiller selectively used to perform the condensation of some of the nitric oxide steam refined by the refining part into the nitric oxide water in the liquid phase.

The condensing part may further include a storage tank for storing the nitric oxide water condensed thereby.

The purifying part may include a solenoid valve connected to the nitric oxide generating part to drain the water in the reaction chamber, the sensor for sensing the pre-set electric current value of the discharge power source indicating the degree of turbidity of the water of the reaction camber, and an electronic control unit for controlling the solenoid valve in accordance with the signal sensed by the sensor to thus purify the water in the reaction chamber.

The electronic control unit of the purifying part may include buttons for setting electric current values to be sensed, and the electric current values set by the buttons are electric current values corresponding to the degree of turbidity at which the water in the reaction chamber is purified, while being not limited numerically. The buttons of the electronic control unit include an L-stage button and an H-stage button set with a difference in the electric current values to be sensed.

Further, 60 Hz AC 220v two-phase power source, AC 380v (three-phases of R-S-T) power source, and AC 460v power source may be selectively used for the arch discharge of the electrode rods disposed in the reaction chamber of the nitric oxide generating part.

The electric current of the discharge power source is a sinusoidal alternating current represented by Equation $I=V/R[A]$, where V indicates voltage, I electric current, and R resistance. An equivalent circuit for the arch discharge is a serial connection circuit that microscopically includes a spatial capacitance resistance C between the two electrode rods disposed inside the reaction chamber but macroscopically includes a resistance value R of the water in the reaction chamber between the two electrode rods.

As appreciated from Equation, the electric current value I of the power source supplied is varied to a function ratio in accordance with the change of the resistance value R of the water in the reaction chamber at a constant voltage V of the power source supplied, so that as the varied electric current value of the power source is sensed, a degree of turbidity of the water in the reaction chamber, which is hard to be observed from the outside, can be indirectly recognized.

Further, the water, which is supplied to the reaction chamber to generate nitric oxide, is underground or tap water.

Into the underground or tap water, all kinds of germs, dead insects, bone particles of crustaceans, algal bloom, microorganisms, aggressive free carbon dioxide, lead, zinc, chromium, copper, iron, silicic acid, manganese, aluminum oxide, arsenic, lactate ions, and various fine organic and inorganic particles, which are introduced through reservoirs or river, are distributed.

As the tap water has been purified and sterilized, no harm is given to a human body when he or she drinks the tap water, but the water is different from pure distilled water in quality. Further, the liquid phase water used to generate nitric oxide has a higher molecular density than the gas phase oxygen or hydrogen, thereby providing a higher production rate when compared with an amount of material. When compared with the purified gas phase oxygen or hydrogen used as the material, the tap water used as the material is more economical and lower at cost.

Next, an operating effect of the present invention is as follows.

Water is filled to a given level into the reaction chamber through the water supplier, and 0.1 to 18 by weight of an electrolyte (NaCl) is added in the water in the reaction chamber. Further, the electric current value of the discharge power source to be sensed is set by means of the L-stage or L-stage button of the sensor of the purifying part, and after a given amount of air is supplied to the water in the reaction chamber through the air pump, a power source is applied to the electrode rods to start arc discharge.

In specific, the $H_2O$ molecules of the water and the molecules of air containing about 20% oxygen and about 80% nitrogen of the reaction chamber are dissolved into elements such as oxygen O, hydrogen H, nitrogen N, and the like by means of ultra-high heat generated from the arc discharge and high heat generated from discharge light, and the dissolved elements are bonded to one another to produce various materials such as water $H_2O$, nitric oxide NO, hydroxyl group (OH radicals), $HNO_2$, $NO_2$, $NO_3$, $NO_4$, $NO_5$, O, $O_2$, $O_3$, $O_4$, $O_5$, ozone, and the like.

The produced materials move to the refining part by means of the internal pressure of the reaction chamber, together with the nitric oxide steam generated through the high heat of the reaction chamber. In the moving process, some of gases are condensed into liquids according to changes in temperature and thus introduced into the reaction chamber by means of their own weight. The nitric oxide steam is introduced into the refining part.

Impurities and various fine particles contained in the nitric oxide steam introduced into the refining part, except nitric oxide components which are desired to be generated, are removed by means of the multi-stage adsorbent filtration material and thus refined into the ultra-high purity nitric oxide steam.

Further, some of the refined nitric oxide steam is supplied in the steam state according to its purpose, and the other nitric oxide steam is condensed into the nitric oxide water in liquid phase by means of the condensing part combinedly using the water-cooling chiller and the air-cooling chiller, stored in the storage tank, filled into given containers, and then put on the market.

If the process of producing the nitric oxide steam through the nitric oxide generating part is carried out for long hours, densities of the impurities of the water in the reaction chamber may be increased because the fine particles accumulatedly remain in the water, without any evaporation. If the water in the reaction chamber has a given degree of turbidity so that it has to be purified, an electrical resistance of the water becomes high to cause the electric current value of the discharge power source to be raised. In this case, the electric current value of the discharge power source, which is pre-set by the L-stage button and the H-stage button of the electronic control unit of the purifying part, is sensed by the sensor, and in accordance with the signal sensed by the sensor, the electronic valve is controlled by means of the electronic control unit, so that the turbid water is drained and simultaneously new water is introduced.

As the water in the reaction chamber is purified, the electrical resistance of the water is reduced to a basic resistance, and accordingly, as the signal sensed by the sensor is eliminated, the purification for the water in the reaction chamber is finished.

In the purification process of the water in the reaction chamber, further, the amount of water corresponding to the amount of the turbid water drained is introduced so that the water in the reaction chamber is kept to a given level. While the nitric oxide steam is being continuously produced, without any stop, it is possible that the water in the reaction chamber is purified.

Unlike the conventional practices, the nitric oxide water generation system according to the present invention can produce high purity nitric oxide steam and water more efficiently and economically.

In specific, nitrous acid $HNO_2$ produced through the arc discharge in the reaction chamber is useful to convert amine into diazonium compounds at the time when azo dyes are manufactured.

The nitrous acid is dissolved into nitric oxide NO, nitrogen dioxide $NO_2$, or nitric acid $HNO_3$. The nitrous acid acts as an oxidizing or reducing agent.

The nitric oxide NO and hydroxyl group (OH radicals) have the next strongest oxidizing power (sterilization, disinfection, and dissolution) to fluorine F and stronger oxidizing power than ozone $O_3$ and chlorine $Cl_2$. However, they do not give any toxicity or harm to the human body, unlike fluorine F, ozone $O_3$, and chlorine $Cl_2$. Further, they serve to reduce all kinds of pollutants in the air and water to safe water $H_2O$ and carbon dioxide $CO_2$ so that the pollutants do not give any harm to the human body.

Anti-bacterial test results for the nitric oxide water generated according to the present invention are suggested in the following Table 1.

TABLE 1

Anti-bacterial tests for nitric oxide water

| Test items | | Test results: Initial Density (CFU/mL | Test results: Density in 24 hours (CFU/mL) | Test results: Germ Reduction rate (%) | Test method | Test Environment |
|---|---|---|---|---|---|---|
| Anti-Bacterial test by *Escherichia coli* | BLANK | $1.7 \times 10^4$ | $6.7 \times 10^4$ | — | Proposed by requester | (36.9 ± 0.1) ° C. (32.9 ± 0.2) % R.H. |
| | NO water (NO plus) | $1.7 \times 10^4$ | <10 | 99.9 | | |
| Anti-Bacterial test by *Pseudomonas aeruginosa* | BLANK | $1.9 \times 10^4$ | $7.1 \times 10^4$ | — | | |
| | NO water (NO plus) | $1.9 \times 10^4$ | <10 | 99.9 | | |

TABLE 1-continued

Anti-bacterial tests for nitric oxide water

| Test items | | Test results: Initial Density (CFU/mL | Density in 24 hours (CFU/mL) | Germ Reduction rate (%) | Test method | Test Environment |
|---|---|---|---|---|---|---|
| Anti-Bacterial test by *Staphylococcus aureus* | BLANK | $1.1 \times 10^4$ | $4.2 \times 10^4$ | — | | |
| | NO water (NO plus ) | $1.1 \times 10^4$ | <10 | 99.9 | | |

CFU: Colony Forming Unit
Density of vaccinated bacteria: $1.7 \times 10^4$ of *Escherichia coli*, $1.9 \times 10^4$ of *Pseudomonas aeruginosa*, and $1.1 \times 10^4$ of *Staphylococcus aureus*
Bacteria used: *Escherichia coli* ATCC 25922
*Pseudomonas aeruginosa* ATCC 15442
*Staphylococcus aureus* ATCC 6538
Feed: Liquid type
Conditions proposed by requester: KCL-FIR-1002 (but liquid type feed)

As appreciated from the test results, the nitric oxide water has 99.9% sterilization.

Deodorization test results for nitric oxide water according to the present invention are as follows.

TABLE 2

Deodorization test for ammonia ($NH_3$)

| Test item | | Unit | Test method | Test results: Blank density (μmol/mol) | Sample density (μmol/mol) | Deodorization rate (%) | Test Environment |
|---|---|---|---|---|---|---|---|
| $NH_3$ deodorization test | 0 min | % | (1) | 50 | 50 | 0.0 | (26.8 ± 0.5) ° C. 42.4 ± 1.7) % RH |
| | 30 min | % | | 49 | 1 | 98.0 | |
| | 60 min | % | | 49 | <0.2 | 99.6 | |
| | 90 min | % | | 49 | <0.2 | 99.6 | |
| | 120 min | % | | 49 | <0.2 | 99.6 | |

Detection limit: 0.2 μmol/mol

TABLE 3

Deodorization test for trimethylamine ( $(CH_3)_3N$)

| Test item | | Unit | Test method | Test results: Blank density (μmol/mol) | Blank density (μmol/mol) | Deodorization rate (%) | Test Environment |
|---|---|---|---|---|---|---|---|
| $(CH_3)_3N$ deodorization test | 0 min | % | (1) | 50 | 50 | 0.0 | (26.8 ± 0.5) ° C. 42.4 ± 1.7) % RH |
| | 30 min | % | | 49 | 1 | 98.0 | |
| | 60 min | % | | 49 | <0.2 | 99.6 | |
| | 90 min | % | | 49 | <0.2 | 99.6 | |
| | 120 min | % | | 49 | <0.2 | 99.6 | |

Detection limit: 0.2 μmol/mol

TABLE 4

Deodorization test for hydrogen sulfide ($H_2S$)

| Test item | | Unit | Test method | Test results | | | Test Environment |
|---|---|---|---|---|---|---|---|
| | | | | Blank density (μmol/umol) | Blank density (μmol/mol) | Deodorization rate (%) | |
| $H_2S$ | 0 min | % | (1) | 50 | 50 | 0.0 | (26.8 ± 0.5) |
| Deodoriza- | 30 min | % | | 49 | <0.1 | 99.8 | ° C. |
| tion test | 60 min | % | | 49 | <0.1 | 99.8 | 42.4 ± 1.7) % |
| | 90 min | % | | 49 | <0.1 | 99.8 | RH |
| | 120 min | % | | 49 | <0.1 | 99.8 | |

Detection limit: 0.2 μmol/mol

TABLE 5

Deodorization test for methyl mercaptan ($CH_3SH$)

| Test item | | Unit | Test method | Test results | | | Test Environment |
|---|---|---|---|---|---|---|---|
| | | | | Blank density (μmol/umol) | Blank density (μmol/mol) | Deodorization rate (%) | |
| $CH_3SH$ | 0 min | % | (1) | 50 | 50 | 0.0 | (26.8 ± 0.5) ° C. |
| deodorization | 30 min | % | | 49 | 15 | 69.4 | 42.4 ± 1.7) % |
| test | 60 min | % | | 49 | <0.2 | 99.8 | RH |
| | 90 min | % | | 49 | <0.2 | 99.8 | |
| | 120 min | % | | 49 | <0.2 | 99.8 | |

Detection limit: 0.2 μmol/mol

As appreciated from the deodorization test results of Table 2 to Table 5, an excellent deodorization effectiveness of more than 99% can be obtained. Accordingly, nitric oxide is adequate for various deodorizers not harmful to the human body.

The nitric oxide steam generated from the nitric oxide water generation system and the nitric oxide water generated by condensing the nitric oxide steam have high purities and excellent qualities, and accordingly, they can be applied for various purposes and places, such as sauna, steaming machines, half bath, foot bath, steam seats, cosmetic cares, medical devices, humidifiers, dryers, purifiers, household items, and the like.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a nitric oxide water generation system according to the present invention will be given with reference to the attached drawings.

Figure 1:
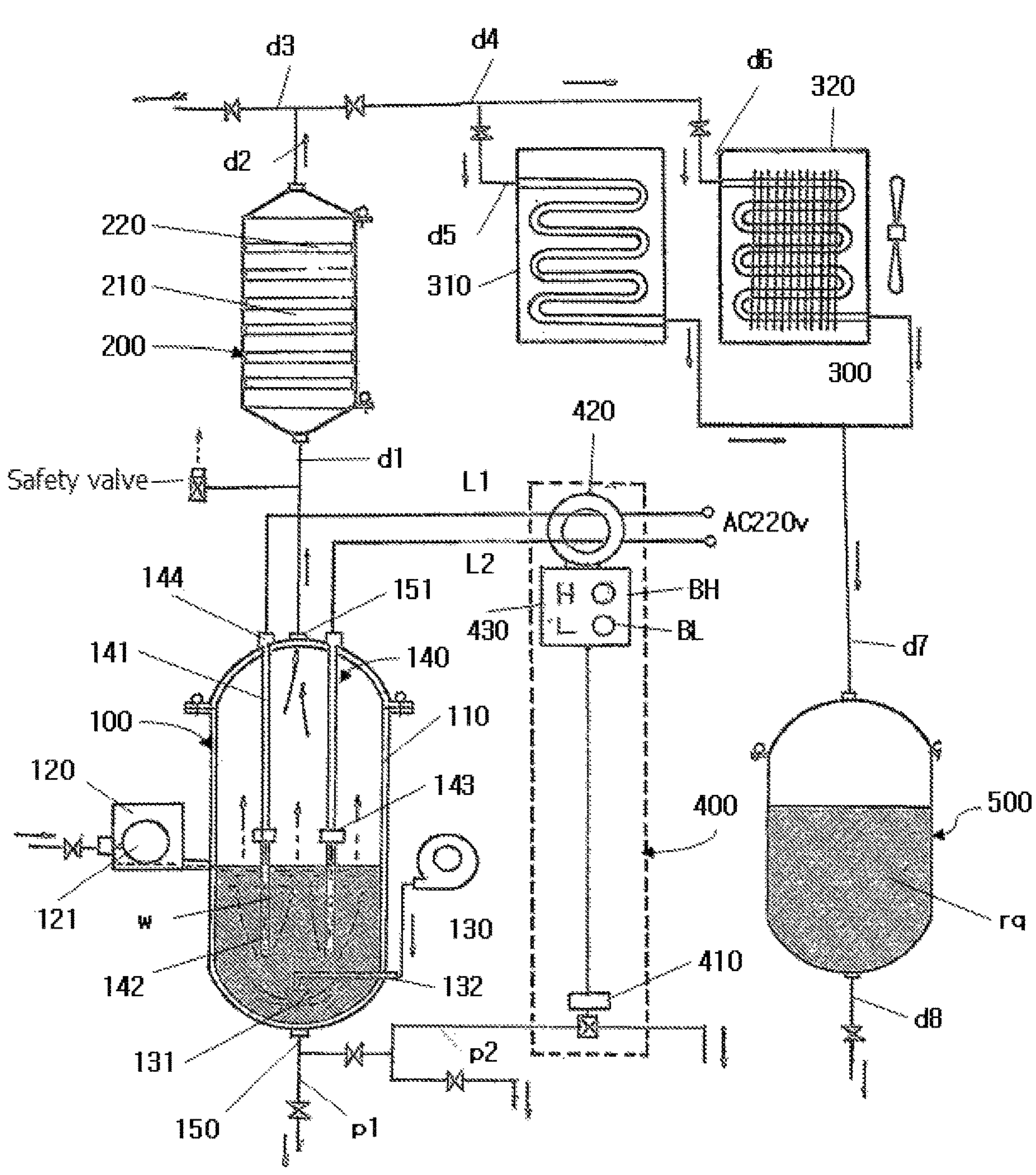
FIG. 1 is a diagram showing a nitric oxide water generation system having a purifying part for automatically purifying water in a reaction chamber according to the present invention.

As shown in FIG. 1, a nitric oxide water generating system according to the present invention includes: a nitric oxide generating part 100 for generating nitric oxide steam from water and air supplied to a reaction chamber 110 through arc discharge; a refining part 200 connected to the nitric oxide generating part 100 to refine the nitric oxide steam generated in the reaction chamber into high purity nitric oxide steam; a condensing part 300 connected to the refining part 200 to condense the nitric oxide steam refined by the refining part 200 into nitric oxide water in liquid phase; and a purifying part 400 connected to the nitric oxide generating part 100 to purify turbid water in the reaction chamber 110.

The nitric oxide generating part 100 for generating nitric oxide steam includes the reaction chamber 110 for generating nitric oxide, a water supplier 120 having a water level adjustor 121 for supplying and keeping the water to the reaction chamber 110 to a given level, and an air pump 130 for supplying the air to the reaction chamber 110 through an injection nozzle 131 and an air supply pipe 132 disposed inside the reaction chamber 110, so that the water and the air are continuously supplied to the reaction chamber 110. Further, a plurality of electrode rods 140 each having a stainless rod 141 and a titanium rod 142 are linearly coupled exchangeably to each other by means of a connector 143 are disposed spaced apart from each other by a given distance in parallel with each other. In this case, two electrode rods 140 are provided at a 220V AC power source, three electrode rods 140 at a 380V AC power source, and four electrode rods 140 at a 460V AC power source. In FIG. 1, two electrode rods 140 are provided at the 220V AC power source.

In specific, 0.1 to 18 by weight of an electrolyte (NaCl) is added in the water w of the reaction chamber 110, and accordingly, if the 220V AC power source is supplied through power source leads L1 and L2 connected to terminals 144 of the electrode rods 140, the arc discharge occurs initially in the reaction chamber 110 easily. As a result, the molecules of the water and air in the reaction chamber 110 are dissolved and bonded through ultra-high heat (more than about 1000° C.) generated from the arc discharge of the electrode rods 140 and high heat generated from discharge light to thus generate the nitric oxide steam.

The nitric oxide steam generated in the reaction chamber 110 is refined by means of the refining part 200.

The refining part 200 includes a refining chamber 210 with a given space connected to the reaction chamber 110 of the nitric oxide generating part 100 through a duct d1 and a multi-stage adsorbent filtration material 220 disposed in the refining chamber 210 to remove impurities from the nitric oxide steam. Accordingly, the nitric oxide steam generated from the reaction chamber 110 of the nitric oxide generating part 100 is introduced in a gaseous state into the refining chamber 210 of the refining part 200 through the duct d1 connected to an outlet 151, and in a process where the nitric oxide steam passes through the refining chamber 210, other materials, components, and fine particles except nitric oxide are removed through the adsorbent filtration material 220, so that the nitric oxide steam is refined into ultra-high purity nitric oxide steam.

Some of the refined nitric oxide steam is supplied to the outside through ducts d2 and d3 from the refining chamber 210, and further, some of the refined nitric oxide steam is introduced into the condensing part 300 through a duct d4 branched from the duct d3 and condensed into a liquid phase.

The condensing part 300 combinedly uses a water-cooling chiller 310 and an air-cooling chiller 320, and accordingly, the condensing part 300 selects any one of the two chillers 310 and 320 to perform the condensation of the refined nitric oxide steam into the liquid phase.

The nitric oxide water rq condensed in the condensing part 300 is stored in a storage tank 500 having a given volume through a duct d7. The nitric oxide water rq stored in the tank 500 is filled in given containers through a duct d8 and then put on the market.

While the nitric oxide steam is being continuously produced in the nitric oxide generating part 100 for long hours, the water in the reaction chamber 110 is purified by means of the purifying part 400.

The purifying part 400 includes a solenoid valve 410 connected to any one of drain pipes p1 and p2 connected to a drain 150 of the reaction chamber 110, a sensor 420 for sensing a pre-set electric current value through the power source leads L1 and L2 of the electrode rods 140, and an electronic control unit 430 for controlling the solenoid valve 410 through the signal sensed by the sensor 420, and the electronic control unit 430 has an L-stage button BL and an H-stage button BH for setting electric current values to be sensed. A difference between the electric current values to be sensed as set by the two buttons is set to about 1 mA, but it may be not limited thereto.

Figure 2:
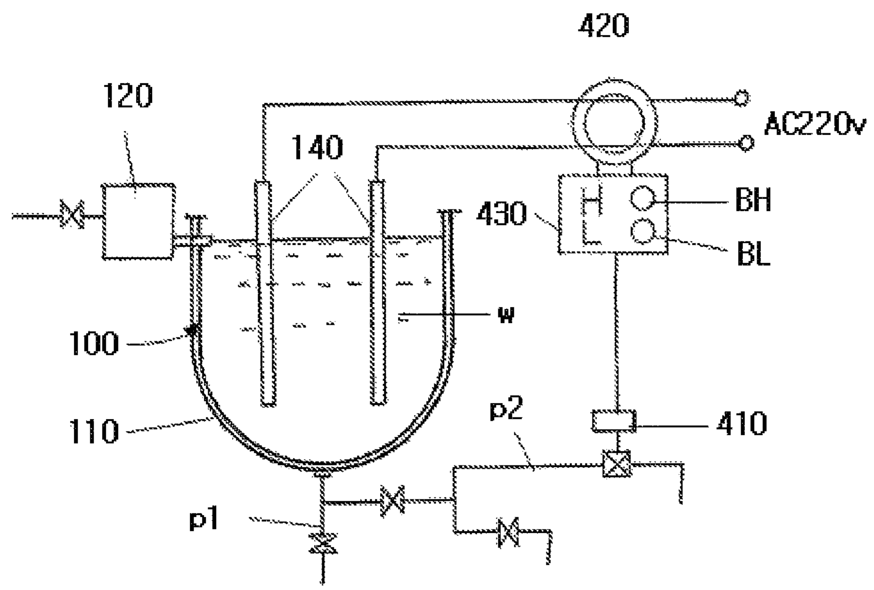
FIG. 2 is a sectional view showing a clean state of water in the reaction chamber according to the present invention.

As shown in FIG. 2, the electric current value to be sensed is set by means of any one of the buttons BL and BH disposed on the electronic control unit 430 of the purifying part 400, and next, the nitric oxide generating part 100 operates to generate the nitric oxide steam. In this case, the water w in the reaction chamber 110 is the purified water as supplied, which is not turbid yet.

Figure 3:
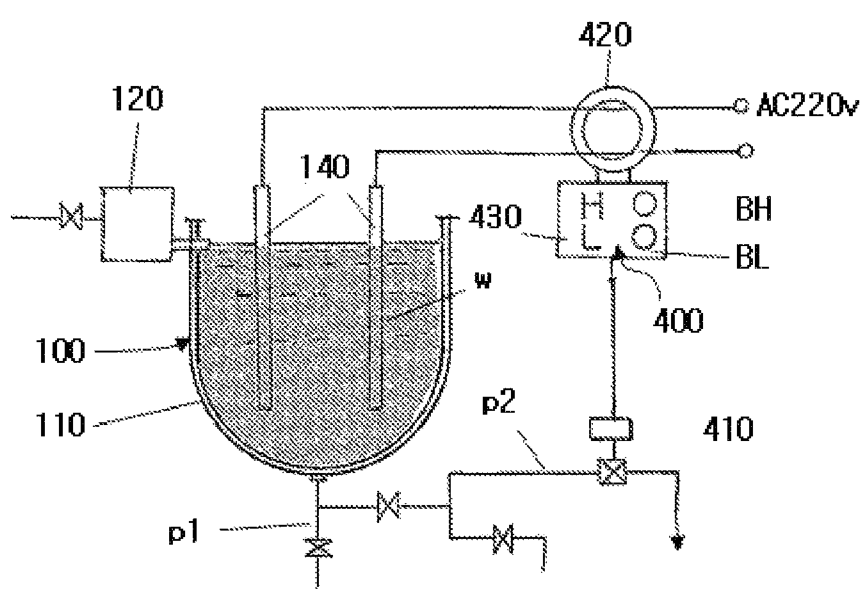
FIG. 3 is a sectional view showing a turbid state of water in the reaction chamber according to the present invention.

As shown in FIG. 3, as the operating time of the nitric oxide generating part 100 passes, the water w in the reaction chamber 110 becomes gradually turbid due to the accumulation of impurities remaining thereon. It is hard to observe the internal state of the reaction chamber 110 from the outside, but if the water in the reaction chamber is so turbid that it has to be purified, the electric current value of the discharge power source, which is set in advance, is sensed by the sensor 420.

The electronic control unit 430 opens the solenoid valve 410 in accordance with the sensed signal of the sensor 420 to allow the turbid water in the reaction chamber 110 to be drained through the solenoid valve 410, and simultaneously, as the level of water in the reaction chamber 110 is decreased, new water is supplied to the reaction chamber 110 through the water supplier 120, so that the water in the reaction chamber 110 is purified, while being kept to a given level.

The water in the reaction chamber 110 can be purified, without stopping the operation of the nitric oxide generating part 100.

Figure 4:
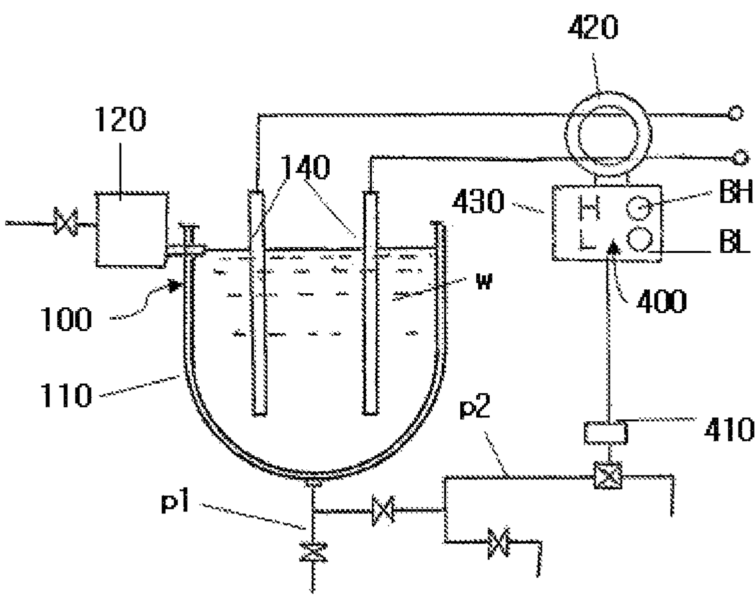
FIG. 4 is a sectional view showing a purified state of water in the reaction chamber according to the present invention.

As shown in FIG. 4, as the water in the reaction chamber 110 is purified, the electric current value sensed by the sensor 420 is eliminated, and accordingly, the solenoid valve 410 stops water draining under the control of the electronic control unit 430. As a result, the purification for the water in the reaction chamber 110 is finished.

As the water in the reaction chamber 110 is automatically purified by means of the purifying part 400, like this, the water in the reaction chamber 110 is always kept clean, thereby producing ultra-high purity nitric oxide water efficiently, economically, and at a low cost in a clean environment.

As described above, the nitric oxide water generation system according to the present invention can generate the nitric oxide steam through the arc discharge in water and air supplied to the reaction chamber by means of the nitric oxide generating part, thereby generating the nitric oxide water at a higher production rate when compared with an amount of material.

Also, the nitric oxide water generation system according to the present invention can refine the nitric oxide steam in the gas phase generated from the reaction chamber by means of the multi-stage adsorbent filtration material of the refining part, thereby obtaining a higher refining effect when compared with the refining effect in the liquid phase to provide high purity nitric oxide steam.

Further, the nitric oxide water generation system according to the present invention can condense the refined high purity nitric oxide steam into the liquid phase by means of the condensing part, thereby obtaining ultra-high purity nitric oxide water, without any separate refining process.

Additionally, the nitric oxide water generation system according to the present invention can automatically purify the water in the reaction chamber in accordance with the signal sensed by the sensor for sensing the pre-set electric current value of the discharge power, if the water in the reaction chamber becomes turbid, so that the water in the reaction chamber, whose internal state is hard to be observed from the outside, can be always kept clean.

Besides, the nitric oxide water generation system according to the present invention can enhance a quality of nitric oxide steam generated therefrom because the water in the reaction chamber can be always kept clean through the purification.

Moreover, the nitric oxide water generation system according to the present invention can continuously generate the nitric oxide steam, even in the purification process of the water in the reaction chamber, thereby producing a large amount of nitric oxide water more efficiently.

Further, the nitric oxide water generation system according to the present invention can have no additional manpower for purification of water in the reaction chamber to thus reduce a purification cost and can decrease an electricity price for the arc discharge through the purification of the water in the reaction chamber.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A nitric oxide water generating system comprising:

a nitric oxide generating part for generating nitric oxide steam from water and air supplied to a reaction chamber through arc discharge, wherein the nitric oxide generating part comprises two arc discharge electrode rods for generating arc discharge;

a refining part connected to the nitric oxide generating part to refine the nitric oxide steam generated from the nitric oxide generating part into high purity nitric oxide steam through an adsorbent filtration material;

a condensing part connected to the refining part to condense the nitric oxide steam refined by the refining part into nitric oxide water in liquid phase through a water-cooling chiller and an air-cooling chiller; and a purifying part connected to the nitric oxide generating part and, if the water in the reaction chamber becomes turbid, for automatically purifying the turbid water in accordance with a signal sensed from a sensor for sensing a pre-set electric current value of a discharge power source, wherein the sensor is connected to power source leads L1 and L2 of the two arc discharge electrode rods, wherein the purifying part comprises the sensor sensing the pre-set electric current value of the discharge power source for the purification of the water in the reaction chamber, a solenoid valve for controlling drainage of the water from the reaction chamber, and an electronic control unit for controlling the solenoid valve through the signal sensed by the sensor to purify the water in the reaction chamber, and wherein in a process of purifying the water in the reaction chamber through the purifying part, the turbid water is drained from the reaction chamber, and simultaneously, new water is supplied to the reaction chamber, wherein the two arc discharge electrode rods are disposed inside the reaction chamber and each arc discharge electrode rod comprises a rod and a titanium rod which are linearly coupled to each other by a connector such that the titanium rod is replaceable, wherein the titanium rods are submerged at least partially in the water, and the air is supplied into a space between the titanium rods.

2. The nitric oxide water generating system according to claim 1, wherein two arc discharge electrode rods are provided at a 220V AC power source, three electrode rods at a 380V AC power source, and four electrode rods at a 460V AC power source.

3. The nitric oxide water generating system according to claim 1, wherein the reaction chamber of the nitric oxide generating part comprises a water supplier having a water level adjustor and an air pump for supplying the air thereto.

4. The nitric oxide water generating system according to claim 1, wherein the refining part comprises a refining chamber connected to the reaction chamber of the nitric oxide generating part and the adsorbent filtration material multi-stagedly disposed in the refining chamber to refine the nitric oxide steam into the high purity nitric oxide steam.

5. The nitric oxide water generating system according to claim 1, wherein the water-cooling chiller and the air-cooling chiller of the condensing part are selectively operated.

6. Oxide water generating system according to claim 1, wherein the electronic control unit of the purifying part comprises buttons for setting electric current values of the discharge power source to be sensed.

7. The nitric oxide water generating system according to claim 6, wherein the buttons of the electronic control unit comprise an L-stage button and an H-stage button configured to set different electric current values of the discharge power source to be sensed by the sensor.

* * * * *